Oct. 17, 1933.                  C. J. PANFIL                  1,931,032
                                 CONTAINER
                             Filed Aug. 22, 1932
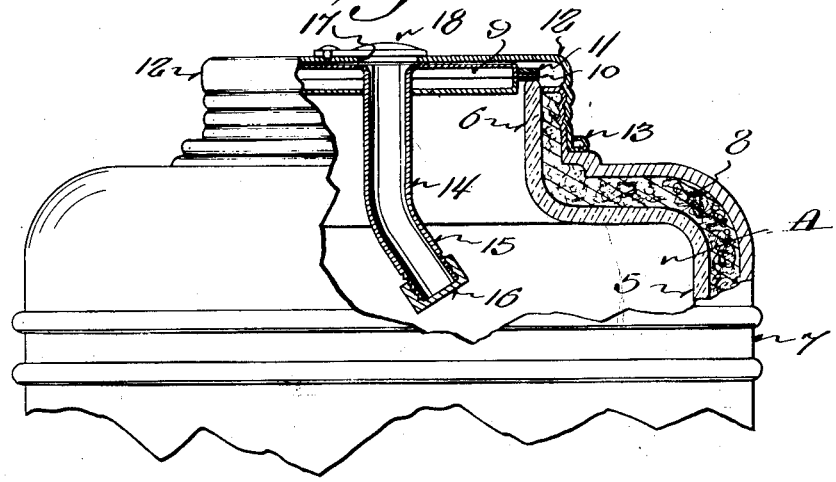
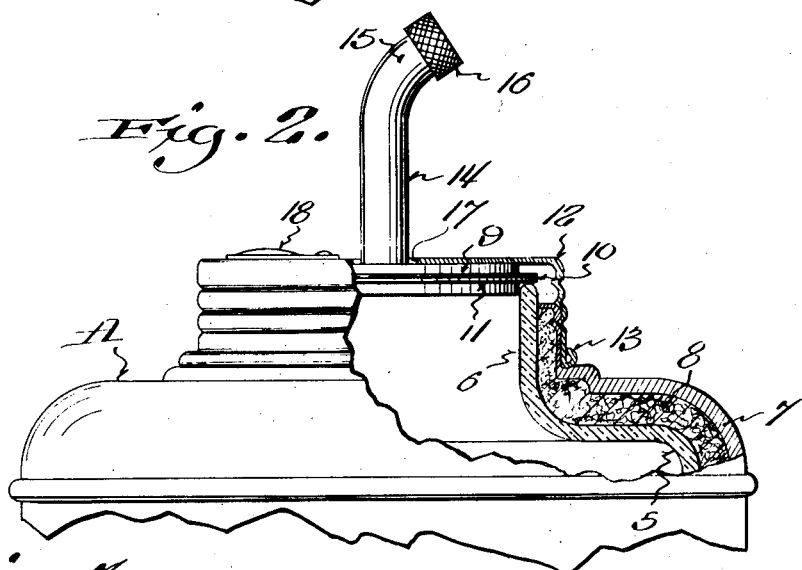
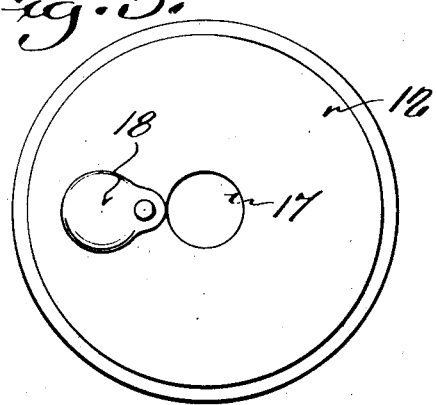

Patented Oct. 17, 1933

1,931,032

UNITED STATES PATENT OFFICE 1,931,032

CONTAINER

Conrad J. Panfil, Milwaukee, Wis.

Application August 22, 1932. Serial No. 629,852

1 Claim. (Cl. 221—24)

This invention appertains to heat insulated jars or bottles of the type employed for maintaining liquids and the like in a warm or cold condition, as the case may be, and more particularly to jugs or jars of the above character of relatively large capacity and having a wide entrance neck.

In jugs of this type considerable difficulty is experienced in pouring liquids out of the wide mouth into the drinking cups or glasses and further where the closure cap is continuously removed from the jug, the temperature of the liquids, being subjected to outside conditions, is quickly changed.

It is therefore one of the primary objects of my invention to provide a novel attachment for heat insulated jugs in which the liquids can be readily poured therefrom without any difficulty on the part of the user of the jug and without danger of the liquids in the jugs being subjected unduly to the temperature of the atmosphere.

Another salient object of my invention is the provision of a heat insulated jug having a stopper for normally closing the mouth of the jug with a pouring spout connected therewith, the spout being adapted to extend through the closure cap, when the stopper is in one of its positions, so that the liquid in the jug can be readily poured out of the jug through the spout into a drinking vessel.

A further important object of my invention is the provision of a heat insulated jug having a wide entrance neck provided with a reversible stopper for fitting on the neck and a cap for holding the stopper on the neck, the stopper having connected with one side thereof a pouring spout, the arrangement being such that the spout can be either disposed within the jug, while the same is being transported or arranged exteriorly of the jug through an opening in the cap when the jug is being used for pouring liquids therefrom.

A still further object of my invention is to provide a novel pouring attachment for heat insulated jugs of the above character, which will be durable and efficient in use, one that will be simple and easy to manufacture and one which can be placed upon the market at a reasonable cost.

With these and other objects in view, the invention consists in the novel construction, arrangement and formation of parts as will be hereinafter more specifically described, claimed and illustrated in the accompanying drawing, in which:

Figure 1 is a fragmentary side elevation of a heat insulated jug with parts thereof broken away and in section illustrating my improved spout incorporated therewith, the spout being shown in its inoperative position.

Figure 2 is a similar view showing the spout in its operative position for pouring.

Figure 3 is a top plan view of the closure cap for the jug.

Referring to the drawing in detail, wherein similar reference characters designate the corresponding parts throughout the several views, the letter A generally indicates a thermos or like jug which may comprise an interior vessel 5 formed from glass or other vitreous material having the enlarged entrance neck 6. The vessel 5 is enclosed within a protecting shell 7, which can be formed of metal or the like. This shell can be suitably painted or otherwise treated so as to present a pleasing appearance. A packing of heat insulating material 8 is enclosed between the vessel 5 and the protecting shell 7.

In order to form a closure for the neck 6, a flat stopper 9 is provided. This stopper 9 is formed of hollow construction so as to form a dead air space and thereby be of heat insulating qualities. The peripheral edge of the stopper is provided with a flange 10 for fitting upon the neck 6 and the flange can be provided with a gasket 11 on one side for engaging the neck. This stopper is of a reversible character and either side of the flange can be placed in engagement with the neck.

In order to hold the stopper 9 on the neck and to further add to the heat insulating qualities of the jug, a cap 12 can be threaded on the neck portion 13 of the protecting shell 7.

In accordance with my invention, the stopper 9 can be provided at its axial center with a pouring spout 14 and this spout extends outwardly beyond one face of the stopper. The extreme outer end of the pouring spout 14 can be provided with a lateral extension 15 to facilitate the directing of the liquid into a cup or other drinking vessel and the outer end of the spout can be closed by a removable plug or threaded cap 16.

As heretofore stated, the stopper 9 is of a reversible character and thus, the spout 14 can either be arranged interiorly of the jug, as shown in Figure 1 or exteriorly of the jug, as shown in Figure 2. When the spout is arranged exteriorly of the jug, the same can be readily used for pouring purposes and when the same is arranged interiorly of the jug, the same will be out of the way and the jug can be readily transported.

As clearly shown in Figures 2 and 3 of the drawing, the threaded cap 12 is provided with an axial opening 17 which can receive the spout 14 when the spout is arranged exteriorly of the jug and thus, the threaded cap 12 can be used for the purpose for holding the stopper on its seat irrespective of whether the spout is arranged inside or outside of the jug.

A movable cover plate 18 is connected with the cap 12, so that the plate can be moved over the opening when the spout is arranged inside of the jug.

From the foregoing description, it can be seen that I have provided an exceptionally simple and durable pouring spout for jugs which will permit the easy handling of the jug for filling drinking vessels without difficulty on the part of the user.

Changes in details may be made without departing from the spirit or the scope of this invention, but what I claim as new is:

A heat insulated jug having a wide entrance neck, a reversible stopper for engaging the neck, said stopper having a pouring spout extending from one side thereof, a removable cap engaging the neck for holding the stopper on said neck provided with an opening for receiving the spout, a closure for the spout, and a swinging plate carried by the cap for normally closing the opening in the cap.

CONRAD J. PANFIL.